US005625872A

United States Patent [19]
Sawyer

[11] Patent Number: 5,625,872
[45] Date of Patent: Apr. 29, 1997

[54] METHOD AND SYSTEM FOR DELAYED TRANSMISSION OF FAST ASSOCIATED CONTROL CHANNEL MESSAGES ON A VOICE CHANNEL

[75] Inventor: Francois Sawyer, St. Hubert, Canada

[73] Assignee: Telefonaktiebolaget LM Ericsson, Stockholm, Sweden

[21] Appl. No.: 362,260

[22] Filed: Dec. 22, 1994

[51] Int. Cl.⁶ .................................................. H04Q 7/20
[52] U.S. Cl. ........................ 455/33.1; 455/54.1; 455/67.1
[58] Field of Search ..................... 455/33.1, 33.2, 455/34.1, 34.2, 53.1, 54.1, 56.1, 62, 63, 67.1; 370/95.1, 95.3; 379/59

[56] References Cited

U.S. PATENT DOCUMENTS

| | | | |
|---|---|---|---|
| 4,799,252 | 1/1989 | Eizenhöffer et al. | 379/59 |
| 4,926,421 | 5/1990 | Kawano et al. | 370/95.1 |
| 5,008,953 | 4/1991 | Dahlin et al. | 455/33 |
| 5,081,679 | 1/1992 | Dent | 455/33.2 |
| 5,119,502 | 6/1992 | Kallin et al. | 455/34.2 |
| 5,140,627 | 8/1992 | Dahlin | 379/60 |
| 5,159,596 | 10/1992 | Itoh | 370/95.1 |
| 5,182,753 | 1/1993 | Dahlin et al. | 371/43 |
| 5,230,082 | 7/1993 | Ghisler et al. | 455/33.2 |
| 5,241,598 | 8/1993 | Raith | 455/54.1 |
| 5,299,198 | 3/1994 | Kay et al. | 370/95.3 |
| 5,317,623 | 5/1994 | Sakamoto et al. | 379/60 |

FOREIGN PATENT DOCUMENTS

672384  11/1989  European Pat. Off. .

OTHER PUBLICATIONS

Stern, H.P., A spectrally efficient narrowband mobile radio system for voice and data communication, *Proceedings of 3rd International Symposium on Personal, Indoor and Mobile Radio Communication*, 1992, IEEE, New York, NY, USA, pp. 525–533.

*Primary Examiner*—Reinhard J. Eisenzopf
*Assistant Examiner*—Thanh Le
*Attorney, Agent, or Firm*—Jenkens & Gilchrist, P.C.

[57] ABSTRACT

A system and method reduces degradation of voice quality due to Fast Associated Control Channel (FACCH) format signaling between a mobile station and a base station on the digital voice channel. The present invention sends FACCH messages either at the expiration of a timer or during breaks in the speech pattern of a mobile user thereby improving digital speech quality while providing flexibility to implement features and services that require intensive FACCH signaling between a base station and a mobile station during voice conversation. Channel associated signaling messages that are not time-critical are synchronized with speech activity detection.

12 Claims, 5 Drawing Sheets

METHOD AND SYSTEM FOR DELAYED TRANSMISSION OF FAST ASSOCIATED CONTROL CHANNEL MESSAGES ON A VOICE CHANNEL

BACKGROUND OF THE INVENTION

1. Technical Field of the Invention

The present invention relates to wireless radio telecommunication systems, and in particular, to an improved method of sending control signals between a base station and a mobile station in a cellular telephone network.

2. Description of Related Art

Wireless communications in general and cellular communications in particular provide for telephony services between mobile users and landline users. In Time Division Multiple Access (TDMA) cellular communications or wireless communications, speech from the user is converted into digital speech samples by a voice coder. These speech samples are sent in bursts on a digital voice channel from a mobile station to a base station, and vice-versa, according to the TDMA structure.

The recent EIA/TIA IS-54B standard for TDMA digital cellular air interface dictates that certain signaling messages between the mobile station and the base station are to be sent in a Fast Associated Control Channel (FACCH) format on the digital voice channel. The IS-54B standard is hereby incorporated by reference herein.

Current methods employed for transmitting FACCH messages on a digital voice channel replace some of the speech information on the voice channel with the FACCH message to be transmitted. An example of such a method is the "blank and burst" method. These current methods, however, are undesirable since numerous transmissions of FACCH messages may lead to voice quality degradation. For this reason, it is necessary to limit the use of signaling between the mobile station and the base station during conversation. This limitation restricts the possibility of implementing features and services that require intensive FACCH signaling.

The IS-54B standard also allows for Discontinuous Transmission (DTX) by the mobile station. In DTX mode of operation, a radio frequency signal is only transmitted from the mobile station to a base station during the period of time in which the mobile user is speaking or a FACCH message is being transmitted. During the time period in which no information is being sent from the mobile station to the base station, the mobile station turns off its transmitter. The time period in which a radio signal is being transmitted from the mobile station is referred to hereinafter as "DTX-high" mode, and the time period in which no radio signal is being transmitted from the mobile station is referred to hereinafter as "DTX-low" mode.

Currently, base stations continuously transmit a downlink signal to mobile stations within their coverage area for the purpose of continuously synchronizing the mobile stations with their associated base station. Thus, base stations are unable to employ a discontinuous (DTX) mode of operation for transmissions to mobile stations.

Although there are no known prior art teachings of a solution to the aforementioned deficiency and shortcoming such as that disclosed herein, U.S. Pat. No. 5,299,198 to Kay et al. discloses a method and apparatus for increasing the capacity of a time division multiple access (TDMA) radio communications system. Kay assigns voice traffic capacity on a speech-spurt basis. Both the mobile and the base stations include speech detectors. Control messages, or speech from other conversations, are sent when a speech detector detects the termination of a speech spurt. Kay teaches the use of a separate channel (forward control channel and reverse control channel) when not in speech. Kay is totally oriented toward filling the gaps in speech activity in order to increase the capacity of a TDMA communications system. Thus, Kay does not teach or suggest delaying the transmission of FACCH messages, required to be transmitted on a digital voice channel, until either there is no speech on the voice channel or a specified period of time has elapsed. Thus, review of the Kay reference reveals no disclosure or suggestion of a system or method such as that described and claimed herein.

It would be a distinct advantage to have a method and system that provides the flexibility necessary to implement features and services that require intensive FACCH signaling between a base station and a mobile station during voice conversation and without severe voice quality degradation. The present invention teaches such a method and system.

SUMMARY OF THE INVENTION

In one aspect, the present invention is a method of delaying the transmission of a non-time-critical Fast Access Control Channel (FACCH) message from a mobile station to a base station on an established voice channel between the mobile station and the base station. The processing of the FACCH message proceeds by starting a timer that specifies a maximum period of time that the FACCH message can be delayed before being transmitted. The processing continues with the monitoring of the speech pattern of a user of the mobile station to determine a break in the speech pattern. The processing ends with the transmission of the FACCH message to the base station on the voice channel during the determined speech pattern break or upon the expiration of the timer, which ever occurs first.

In yet another aspect, the present invention is a method of delaying the transmission of a Fast Access Control Channel (FACCH) message from a base station to a mobile station on an established voice channel between the base station and the mobile station. The base station includes a speech coder for encoding and decoding speech from a source user to a subscriber of the mobile station. The processing of the FACCH message begins with the starting of a timer that specifies a maximum period of time that the FACCH message can be delayed before being transmitted. The processing continues with the monitoring of the speech pattern of the source user to determine a break in the speech pattern. The processing ends with the transmission of the FACCH message to the mobile station on the voice channel during the determined speech pattern break or upon the expiration of the timer, whichever occurs first.

In yet another aspect, the present invention is a mobile telecommunications system for delaying the transmission of a non-time-critical Fast Access Control Channel (FACCH) message from a base station to a mobile station on an established voice channel between the base station and the mobile station. The telecommunications system includes means for starting a timer that specifies a maximum period of time that the FACCH message can be delayed before being transmitted. The system also includes means for monitoring the speech pattern of a user of the mobile station to determine when a speech burst is occurring in the speech pattern. The system further includes means for transmitting the FACCH message to the mobile station on the voice channel during the determined speech burst or upon the expiration of the timer, whichever occurs first.

Thus, the present invention is a method and system in which a non-time-critical FACCH message, that is required to be transmitted on a digital voice channel, is delayed from being transmitted until either there is a break in the speech on the voice channel or until the expiration of a specified period of time. Such a method and system provides the flexibility necessary to implement features and services that require intensive FACCH signaling between a base station and a mobile station during voice conversation and without severe voice quality degradation.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
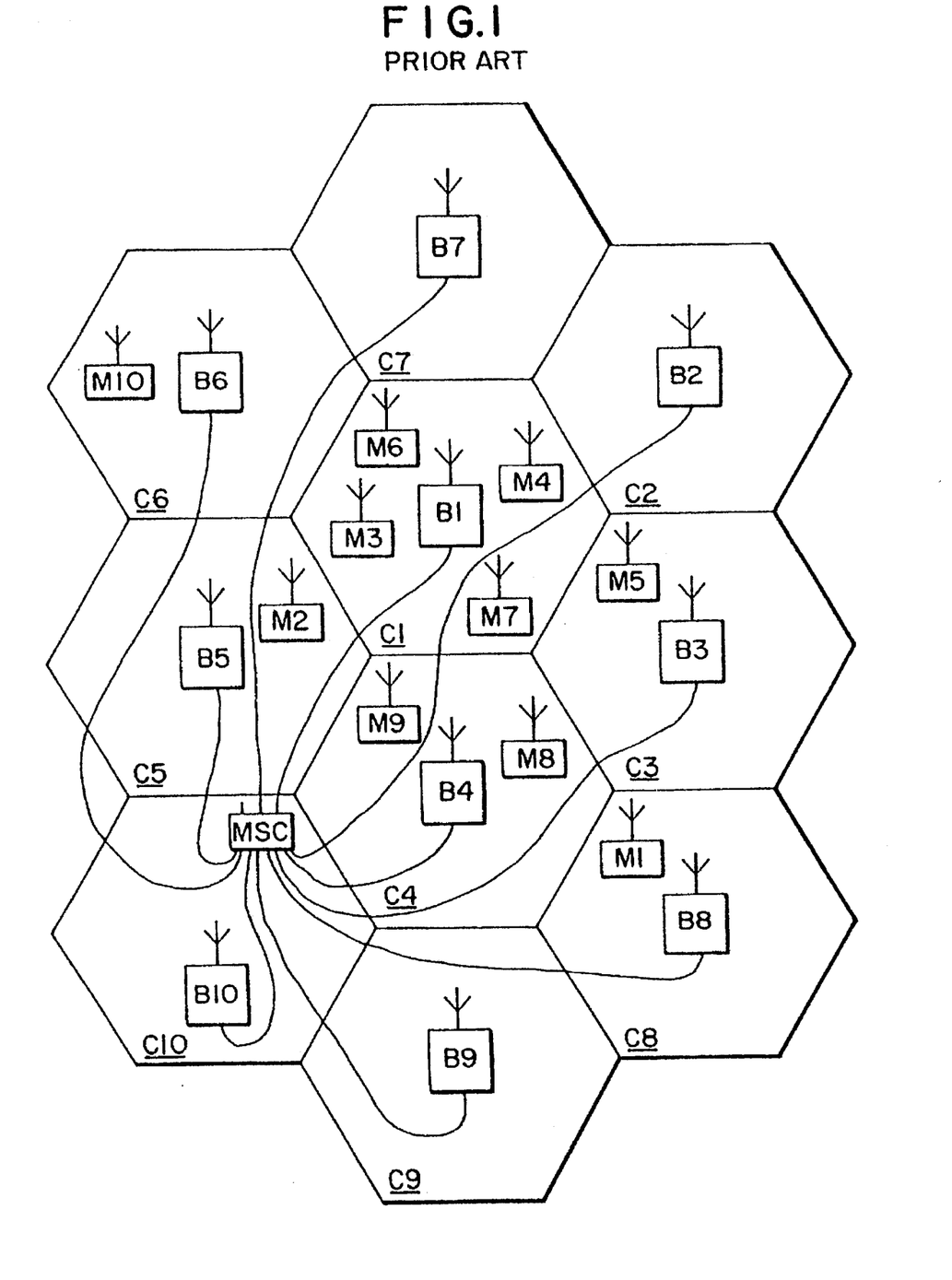
FIG. 1 (Prior Art) is an illustrative representation of a cellular radio communication system including a mobile switching center, a plurality of base stations, and a plurality of mobile stations.

Referring first to FIG. 1, there is illustrated a conventional cellular radio communications system of the type to which the present invention generally pertains. In FIG. 1, an arbitrary geographic area may be divided into a plurality of continuous radio coverage areas, or cells C1–C10. While the system of FIG. 1 is illustratively shown to include only 10 cells and 1 MSC, it should be clearly understood that in practice, the number of MSCs and cells within each MSC will be much larger.

Associated with and located within each of the cells C1–C10 is a base station assigned as a corresponding one of a plurality of base stations B1–B10. Each of the base stations B1–B10 include a transmitter, a receiver, and a base station controller as are well known in the art. In FIG. 1, the base stations B1–B10 are illustratively located at the center of each of the cells C1–C10, respectively, and are equipped with omni-directional antennas. However, in other configurations of a cellular radio system, the base stations B1–B10 may be located near the periphery, or otherwise away from the centers of the cells C1–C10 and may illuminate the cells C1–C10 with radio signals either omni-directionally or directionally. Therefore, the representation of the cellular radio system of FIG. 1 is for purposes of illustration only and is not intended as a limitation on the possible implementations of the cellular radio system within which the system of the present invention is implemented.

With continuing reference to FIG. 1, a plurality of mobile stations M1–M10 may be found within the cells C1–C10. Again, only 10 mobile stations are shown in FIG. 1 but it should be understood that the actual number of mobile stations will be much larger in practice and will invariably greatly exceed the number of base stations. Moreover, while none of the mobile stations M1–M10 may be found in some of the cells C1–C10, the presence or absence of the mobile stations M1–M10 in any particular one of the cells C1–C10 should be understood to depend, in practice on the individual desires of the mobile stations M1–M10 who may roam from one location in the cell to another or from one cell to an adjacent cell or neighboring cell, and, in addition, from one cellular radio system served by a particular MSC to another such system served by a different MSC.

Each of the mobile Stations M1–M10 is capable of initiating or receiving a telephone call through one or more of the base stations B1–B10 and a mobile switching center MSC. A mobile switching center MSC is connected by communication links, e.g., cables, to each of the illustrative base stations B1–B10 and to the fixed public switched telephone network PSTN, not shown, or a similar fixed network which may include an integrated services digital network (ISDN) facility. The MSC shown is also connected to other MSCs making up the cellular radio system network. The relevant connections between the mobile switching center MSC and the base stations B1–B10, or between the mobile switching center MSC and the PSTN or ISDN and other MSCs, are not completely shown in FIG. 1 but are well known to those of ordinary skill in the art. Similarly, it is also known to include more than one mobile switching center in a cellular radio system and to connect each additional mobile switching center to a different group of base stations and to other mobile switching centers via cable or radio links.

Each of the cells C1–C10 is allocated a plurality of voice or speech channels and at least one access or control channel, such as a forward control channel (FOCC). The control channel is used to control or supervise the operation of mobile stations by means of information transmitted to and received from those units. Such information may include incoming call signals, outgoing call signals, page signals, page response signals, location registration signals, voice channel assignments and maintenance instructions. The control or voice channels may operate either in an analog or digital mode or a combination thereof.

Figure 2:
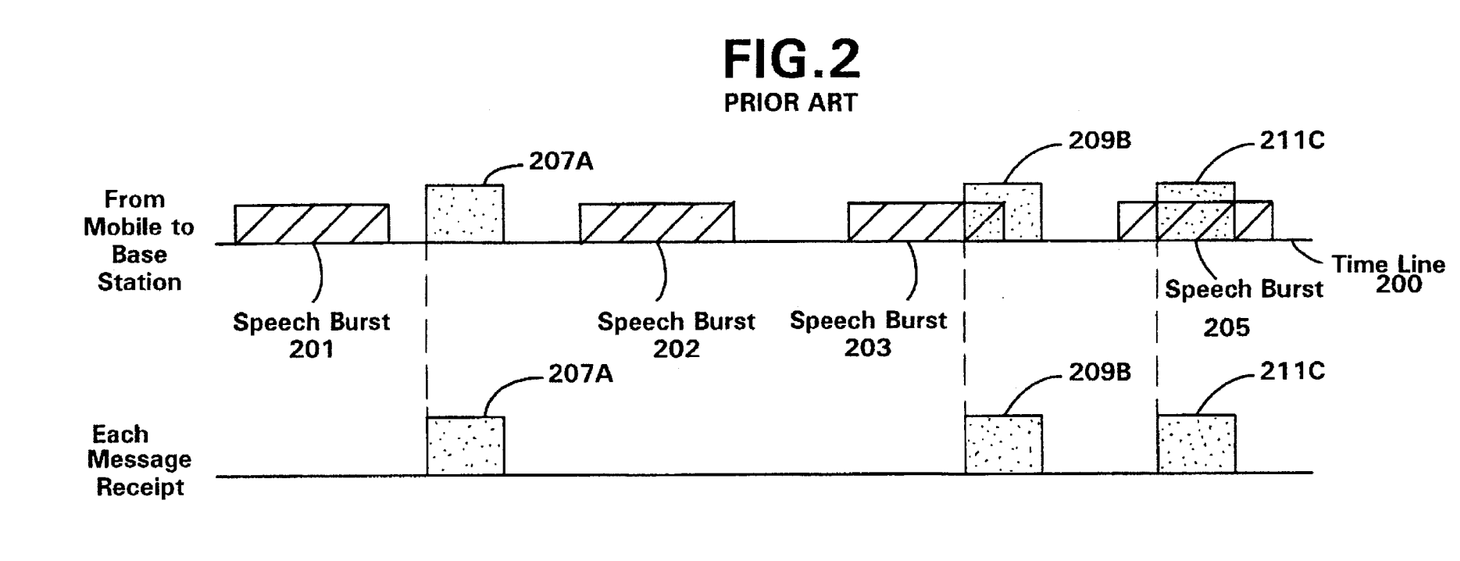
FIG. 2 (Prior Art) is a timing diagram illustrating current methods for transmitting FACCH messages from a mobile station to a base station on an established digital voice channel.

Human speech may be described as consisting of audible portions and silence. In telecommunications, the audible portions of the speech are referred to as speech bursts. Referring now to FIG. 2, a timing diagram is shown for illustrating current methods for transmitting FACCH messages from a mobile station to a base station on an established digital voice channel. The speech of a mobile user is represented over time on time line 200 as speech bursts 201, 202, 203, and 205. The methods currently employed for transmitting a FACCH message on a digital voice channel transmit the FACCH message immediately upon receipt. These methods may result in degradation of speech quality for the mobile user depending on their interaction with speech bursts, as illustrated in the examples below.

For example, FACCH message A 207 is transmitted immediately upon receipt on the voice channel. The transmission of FACCH message A 207, however, does not result in the degradation of the speech quality of the mobile user, since it is transmitted during the silence between speech bursts 201 and 202. In another example, FACCH message B 209 is transmitted immediately upon receipt on the voice channel, and results in partial degradation of the speech quality of the mobile user. The partial degradation results from the replacement of speech information within speech burst 203 with part of the FACCH message B 209.

In yet another example, FACCH message C 211 is immediately transmitted upon receipt on the voice channel, and once again, results in degradation of the speech quality of the mobile user. The degradation, however, is more severe than from the previous transmission of FACCH message B 209, since an entire block of speech information within speech burst 205 that is equivalent to the size of FACCH message C 211 is replaced. Thus, the current method of immediately transmitting FACCH messages upon receipt on the voice channel often interferes with speech bursts and unnecessarily results in degradation of the voice quality of the mobile user. Although the examples enumerated above were made in reference to speech occurring from the mobile station to the base station, the current methods employ the same technique for transmitting FACCH messages from the base station to the mobile station on a voice channel. Consequently, resulting in the unnecessary degradation of the voice quality of a party in communication with the mobile user.

Figure 3:
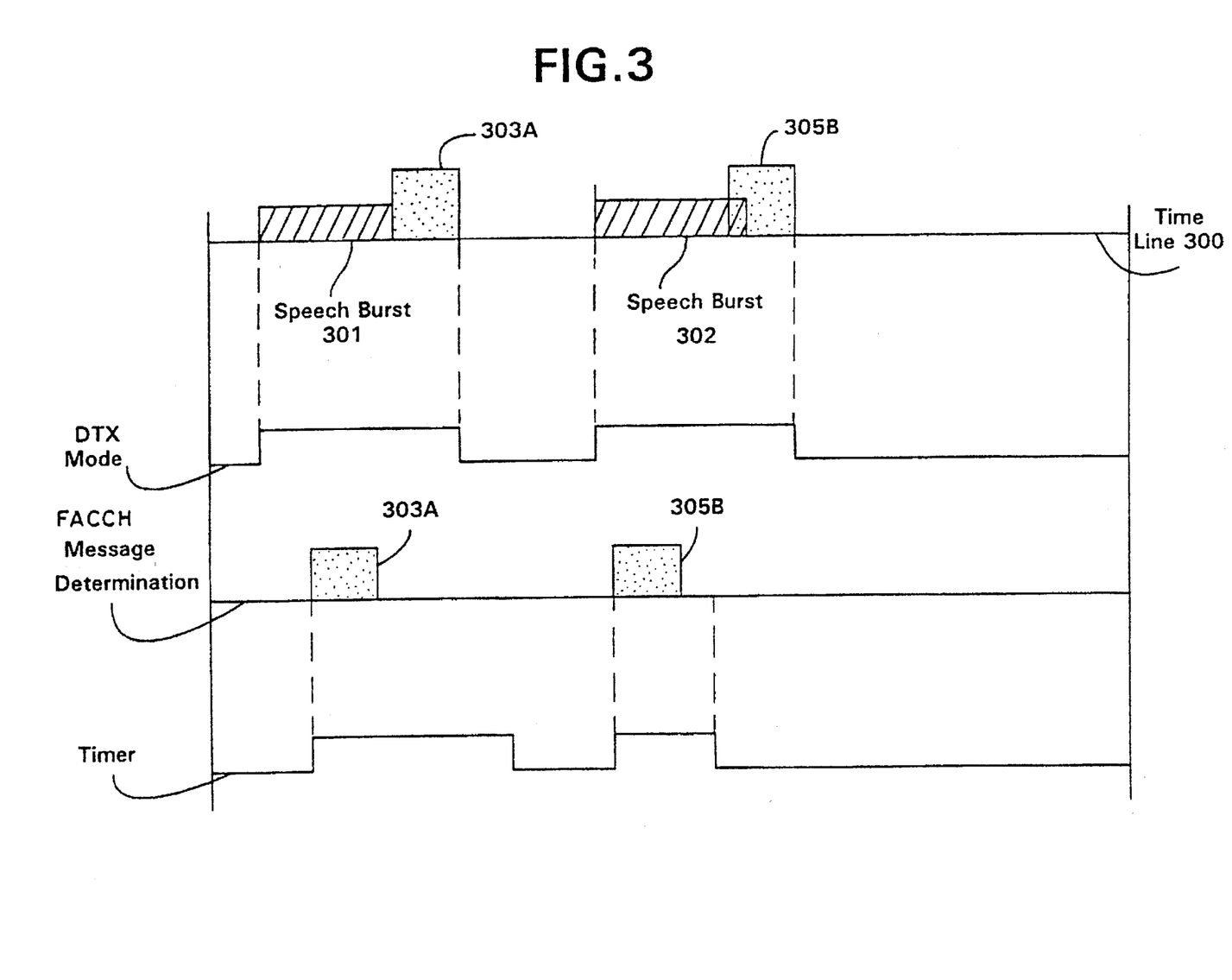
FIG. 3 is a timing diagram illustrating the transmissions of delayed FACCH messages from a mobile station to a base station on an established voice channel according to the preferred embodiment of the present invention.

Referring now to FIG. 3, a timing diagram is shown for illustrating the transmission of delayed FACCH messages from a mobile station to a base station on an established voice channel according to the preferred embodiment of the present invention. The speech of a mobile user is represented over time on time line 300 as speech bursts 301 and 302. The method of the present invention delays the transmission of a FACCH message on the voice channel until either a break in the speech of the mobile user is detected, or until the expiration of a timer.

In the preferred embodiment of the present invention, mobile stations use DTX operation, and base stations communicating with the mobile stations support DTX use. The DTX mode of "DTX-high" is used in the method of the present invention to determine when speech bursts of the mobile user are occurring. In addition, each mobile station includes a speech activity detection circuit for determining the initiation and completion of a speech burst and/or FACCH message. In each of the examples enumerated below, a timer is commenced upon the determination by a mobile station that a FACCH message is to be transmitted on the voice channel from the mobile station to the base station. The period of time indicated by the timer is the maximum amount of time that the FACCH message can be delayed.

For example, during speech burst 301, it is determined that FACCH message A 303 is to be transmitted on the voice channel. Contrary to current methods, however, the method of the present invention delays transmission of FACCH Message A 303 until either a maximum period of time for delaying its transmission has expired or until a break in the speech of the mobile user is detected, whichever occurs first. The method includes the initiation of a timer upon the determination that FACCH Message A is to be transmitted. In this case, a break in the speech of the mobile user is detected before the expiration of the timer, by any suitable means such as, for example, the speech activity detection circuit FACCH message A 303 is then transmitted during the period of time indicated on time line 300 between speech bursts 301 and 302.

Still referring to FIG. 3, a second is illustrated in which example, the mobile station determines during speech burst 302 that FACCH message B 305 is to be transmitted, and a timer is initiated. In this case, speech burst 302 lasts longer than the timer, therefore FACCH message A 303 is transmitted at the expiration of the timer, and speech information from speech burst 302 is partially replaced with FACCH message B 305.

Figure 4:
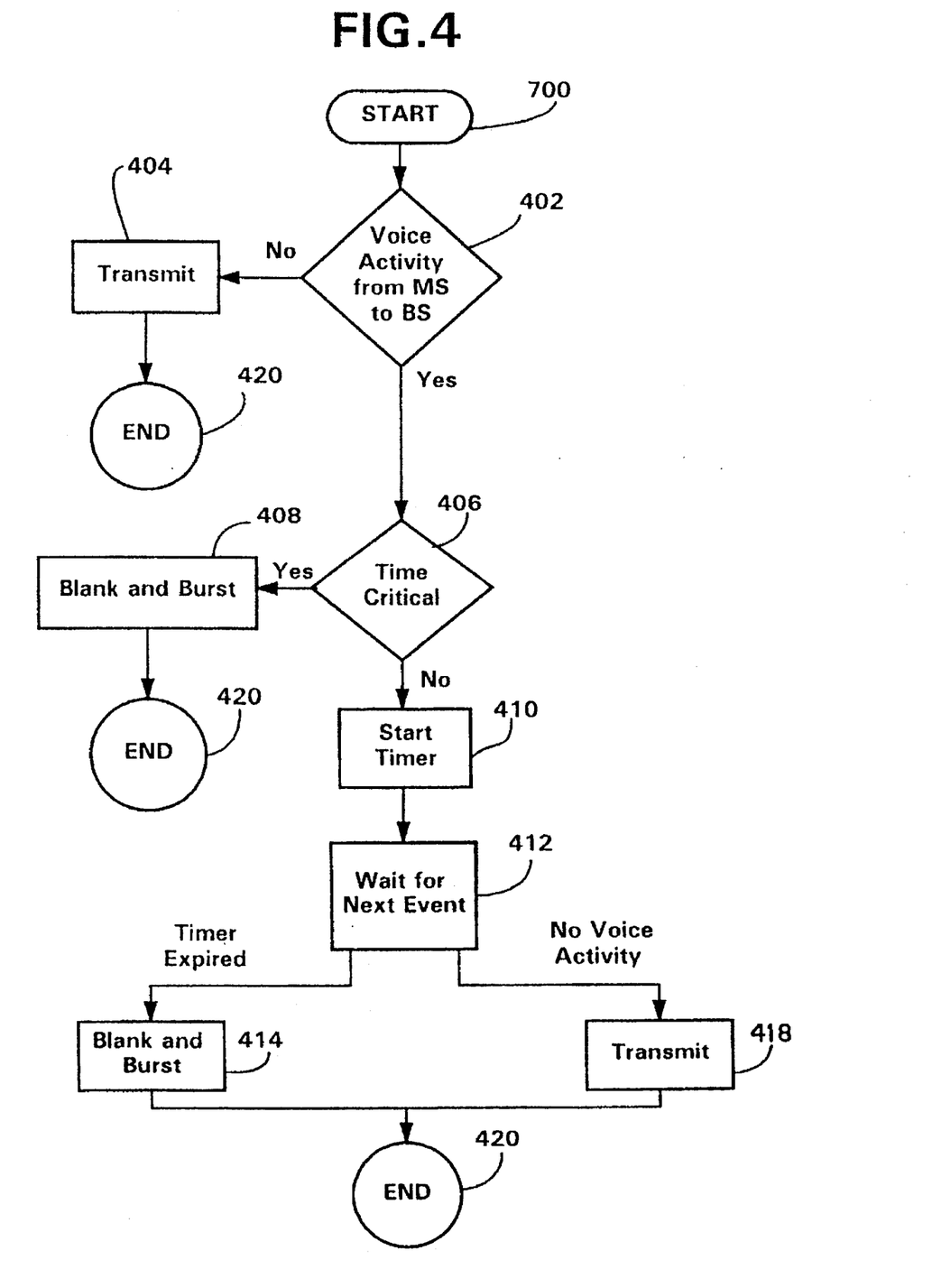
FIG. 4 is a flow chart illustrating the steps taken when transmitting delayed FACCH messages from a mobile station to a base station on an established digital voice channel during breaks in the speech of the mobile user according to the preferred embodiment of the present invention.

Referring now to FIG. 4, a flow chart is shown illustrating the steps taken when transmitting delayed FACCH messages from a mobile station to a base station on an established digital voice channel during breaks in the speech of the mobile user according to the preferred embodiment of the present invention. The mobile station may be, for example, mobile station M10 of FIG. 1, which is located within the coverage area of base station B6 of FIG. 1.

The method is initiated at step 400 upon the decision by the mobile station M10 that a FACCH message is required to be sent on the established digital voice channel to the base station B6. The method then proceeds to step 402 where it is determined by suitable means whether or not there is currently voice activity being transmitted from the mobile station M10 to the base station B6 on the voice channel. The voice activity detection circuit of the mobile station M10 for example, may be used for this determination. If there is currently no voice activity on the voice channel from the mobile station M10 to the base station B6, then the method proceeds to transmit the FACCH message at step 404. Thereafter, the method proceeds to end at step 420. If, however, voice activity from the mobile station M10, to the base station B6 is presently occurring on the voice channel, then the method proceeds to step 406.

At step 406, it is determined whether or not the received FACCH message is time-critical. A FACCH message is considered to be time-critical when the action indicated by the FACCH message must be implemented immediately without delay. An example of a time-critical FACCH message is a "MOBILE ACKNOWLEDGEMENT" FACCH message sent by the mobile station M10 in response to receiving a "HANDOFF" FACCH message from the base station B6. If, at 406, it is determined that the FACCH message is time-critical, then the FACCH message must be transmitted immediately. Therefore, the method proceeds to step 408 and immediately transmits the FACCH message to the base station B6 without regard to the presence of voice activity from the mobile Station M10 to the base station B6 on the voice channel. This may result in the replacement of some voice information with the FACCH message, depending upon whether the speech activity is in an audible portion or a silence period. In any case, since the number of time-critical FACCH messages is relatively low, the degradation in voice quality is slight. Thereafter, the method proceeds to end at step 420.

If, however, it is determined at step 406 that the FACCH message is non-time-critical, then the method proceeds to step 410 where a timer is started. The timer is employed to indicate a maximum period of time that the non-time-critical FACCH message may be delayed before transmission to the base station B6. Thereafter, the method proceeds to step 412 where it awaits the occurrence of either the expiration of the timer or a break in speech activity from the mobile station M10 to the base station B6. A break in the speech activity may be detected with the voice activity detection circuit of the mobile station M10. If the timer expires before a break in speech activity is detected, then the method proceeds to step 414 where the FACCH mess age is transmitted to the base station B6 using the blank and burst method of replacing speech information with the FACCH message. Thereafter, the method proceeds to end at step 420. If, however, a break in speech activity is detected before the expiration of the timer, then the method proceeds to step 418 where the FACCH message is transmitted to the base station B6. Thereafter, the method proceeds to end at step 420.

Figure 5:
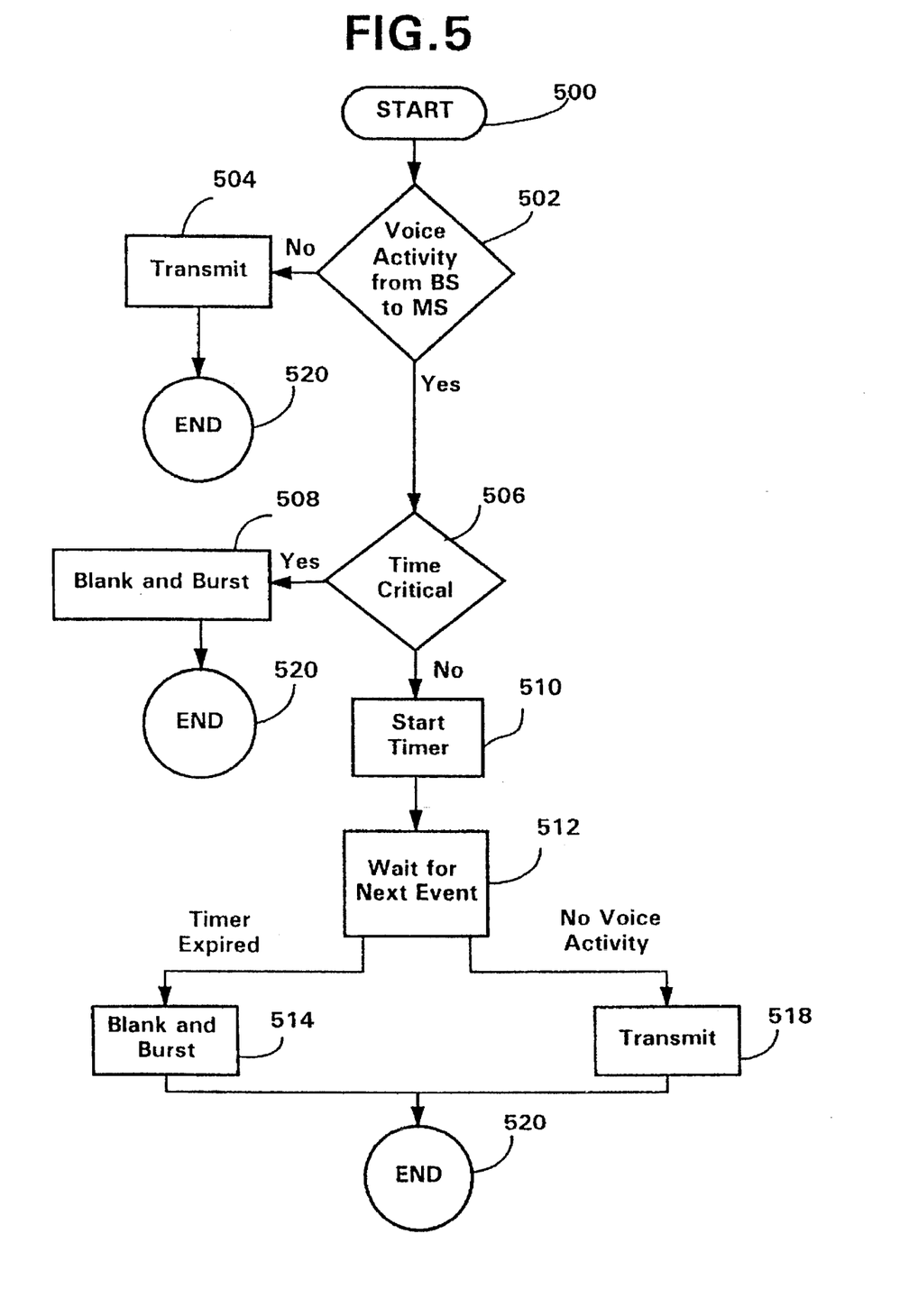
FIG. 5 is a flow chart illustrating the steps taken when transmitting delayed non-time-critical FACCH messages from a base station to a mobile station on an established digital voice channel during the speech of the mobile user according to the preferred embodiment of the present invention.

Referring now to FIG. 5, a flow chart is shown illustrating the steps taken when transmitting delayed FACCH messages from a base station to a mobile station on an established digital voice channel during the speech of the mobile user according to the preferred embodiment of the present invention. The mobile station may be, for example, mobile station M10 of FIG. 1, which is located within the coverage area of base station B6 of FIG. 1.

The method is initiated at step 500 upon the decision by the base station B6 that a FACCH message is required to be sent on the established digital voice channel to the mobile station M10. The method then proceeds to step 502 where it is determined whether or not voice activity is currently being transmitted from the base station B6 to the mobile station M10 on the voice channel. Voice activity from the base station B6 to mobile station M10 on the voice channel may be detected by the DTX mode of mobile station M10. If the DTX mode of the mobile station M10 is equal to "DTX-low", then it is assumed that voice activity is currently being transmitted from the base station B6 to the mobile station M10, and the method proceeds to step 506. If, however, the DTX mode of the mobile station M10 is equal to "DTX-high", then it is assumed that no voice activity is currently being transmitted from the base station B6 to the mobile station M10, and the FACCH message is transmitted to the mobile station M10 at step 504. Thereafter, the method proceeds to end at step 520.

At step 506, it is determined whether or not the received FACCH message is time-critical. A FACCH message is considered to be time-critical when the action indicated by the FACCH message must be implemented immediately without delay. An example of a time-critical FACCH message is "HANDOFF". If at 506, it is determined that the FACCH message is time-critical, then the method proceeds to immediately transmit the FACCH message without regard to the presence of voice activity on the voice channel at step 508. This may result in the replacement of some voice information with the FACCH message, depending upon whether the speech activity is in an audible portion or a silence period. In any case, since the number of time-critical FACCH messages is relatively low, the degradation in voice quality is slight. Thereafter, the method proceeds to end at step 520.

If, however, it is determined at step 506 that the FACCH message is non-time-critical, then the method proceeds to step 510 where a timer is started. The timer is employed to indicate a maximum period of time that the non-time-critical FACCH message may be delayed from being transmitted to the mobile station M10. Thereafter, the method proceeds to step 512 where it awaits for the occurrence of either the expiration of the timer or a break in speech activity from the base station B6 to the mobile station M10, which ever occurs first. If the timer expires before a break in speech activity is detected, then the method proceeds to step 514 and transmits the FACCH message to the mobile station M10. The method may utilize, for example, the blank and burst method of replacing speech information with the FACCH message. Thereafter, the method proceeds to end at step 520. If, however, a break in speech activity is detected before the expiration of the timer, then the method proceeds to step 518.

It is assumed that no voice activity is currently being transmitted from the base station B10 to the mobile station M10 when the DTX mode of the mobile station M10 is equal to "DTX-high". If the DTX mode of the mobile station is equal to "DTX-high", then the method proceeds to step 518 and transmits the FACCH message to the mobile station M10. Thereafter, the method proceeds to end at step 520. In an alternative embodiment, the base station B6 can use the energy level output of its internal speech coder to determine voice activity from the base station B6 to the mobile station M10. A very low level of energy output from the speech coder would correspond to no voice activity on the voice channel. Conversely, a high level of energy output from the speech coder would correspond to voice activity on the voice channel.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A method of delaying the transmission of a non-time-critical Fast Access Control Channel (FACCH) message from a mobile station to a base station on an established voice channel between said mobile station and said base station, said method comprising the steps of:

starting a timer that specifies a maximum period of time that said FACCH message can be delayed before being transmitted;

monitoring the speech pattern of a user of said mobile station to determine a break in said speech pattern; and transmitting said FACCH message to said base station on said voice channel during said determined break or upon the expiration of said timer, whichever occurs first.

2. The method of claim 1 wherein said mobile station includes a voice activity detection circuit, and said step of monitoring the speech pattern of a user includes the step of:

monitoring the speech pattern of said user using said voice activity detection circuit to determine said break in said speech pattern.

3. A method of delaying the transmission of a non-time-critical Fast Access Control Channel (FACCH) message from a base station to a mobile station on an established voice channel between said base station and said mobile station, said method comprising the steps of:

starting a timer that specifies a maximum period of time that said FACCH message can be delayed before being transmitted;

monitoring the speech pattern of a user of said mobile station to determine when a speech burst is occurring in said speech pattern; and transmitting said FACCH message to said mobile station on said voice channel during said determined speech burst or upon the expiration of said timer, whichever occurs first.

4. The method of claim 3 wherein said mobile station employs discontinuous transmission and said base station supports said discontinuous transmission, said discontinuous transmission indicating a high mode during a speech burst of said user, and said step of monitoring the speech pattern of said user includes the step of:

monitoring said discontinuous transmission of said mobile station for said high mode to determine when said speech burst is occurring in said speech pattern.

5. A method of delaying the transmission of a Fast Access Control Channel (FACCH) message from a base station to a mobile station on an established voice channel between said base station and said mobile station, said base station having a speech coder for encoding and decoding speech from a source user to a subscriber of said mobile station, said method comprising the steps of:

starting a timer that specifies a maximum period of time that said FACCH message can be delayed before being transmitted;

monitoring the speech pattern of said source user to determine a break in said speech pattern; and transmitting said FACCH message to said mobile station on said voice channel during said determined break or upon the expiration of said timer.

6. The method of claim 5 wherein said speech coder has an output energy level proportional to said speech pattern of said source user, and said step of monitoring the speech pattern of said source user includes the step of:

monitoring said speech pattern of said source user using said output energy level of said speech coder to determine said break in said speech pattern.

7. A mobile telecommunications system for delaying the transmission of a non-time-critical Fast Access Control Channel (FACCH) message from a mobile station to a base station on an established voice channel between said mobile station and said base station, said system comprising:

a timer that specifies a maximum period of time that said FACCH message can be delayed before being transmitted;

means for starting said timer upon the determination that said FACCH message is to be transmitted on said voice channel;

means for monitoring the speech pattern of a user of said mobile station to determine a break in said speech pattern; and means for transmitting said FACCH message to said base station on said voice channel during said determined break or upon the expiration of said timer, whichever occurs first.

8. The mobile telecommunications system of claim 7 wherein said mobile station includes a voice activity detection circuit, and said means for monitoring the speech pattern of a user includes:

means for monitoring the speech pattern of said user using said voice activity detection circuit to determine said break in said speech pattern.

9. A mobile telecommunications system for delaying the transmission of a non-time-critical Fast Access Control Channel (FACCH) message from a base station to a mobile station on an established voice channel between said base station and said mobile station, said system comprising:

a timer that specifies a maximum period of time that said FACCH message can be delayed before being transmitted;

means for starting said timer upon the determination that said FACCH message is to be transmitted on said voice channel;

means for monitoring the speech pattern of a user of said mobile station to determine when a speech burst is occurring in said speech pattern; and means for transmitting said FACCH message to said mobile station on said voice channel during said determined speech burst or upon the expiration of said timer, whichever occurs first.

10. The mobile telecommunications system of claim 9 wherein said mobile station employs discontinuous transmission and said base station supports said discontinuous transmission, said discontinuous transmission indicating a high mode during a speech burst of said user, and said means for monitoring the speech pattern of said user includes:

means for monitoring said discontinuous transmission of said mobile station for said high mode to determine when said speech burst is occurring in said speech pattern.

11. A mobile telecommunications system for delaying the transmission of a Fasts Access Control Channel (FACCH) message from a base station to a mobile station on an established voice channel between said base station and said mobile station, said base station having a speech coder for encoding and decoding speech from a source user to a subscriber of said mobile station, said system comprising:

a timer that specifies a maximum period of time that said FACCH message can be delayed before being transmitted;

means for starting said timer upon the determination that said FACCH message is to be transmitted on said voice channel;

means for starting said time upon receipt of said FACCH message on said voice channel;

means for monitoring the speech pattern of said source user to determine a break in said speech pattern; and means for transmitting said FACCH message to said mobile station on said voice channel during said determined break or upon the expiration of said timer, whichever occurs first.

12. The mobile telecommunications system of claim 11 wherein said speech coder has an output energy level proportional to said speech pattern of said source user, and said means for monitoring the speech pattern of said source user includes:

means for monitoring said speech pattern of said source user using said output energy level of said speech coder to determine said break in said speech pattern.

\* \* \* \* \*